United States Patent [19]

Elbrader et al.

[11] 4,363,643

[45] Dec. 14, 1982

[54] SUPPORT MEANS FOR FILTER MATERIAL IN A NON-ELECTRIC AIR CLEANER

[75] Inventors: Clifford B. Elbrader, Boone; Jimmy L. Milum, Harrison, both of Ark.

[73] Assignee: Emerson Electric Co., St. Louis, Mo.

[21] Appl. No.: 312,152

[22] Filed: Oct. 16, 1981

[51] Int. Cl.³ ............................................. B01D 46/52
[52] U.S. Cl. ........................................ 55/499; 55/481; 55/500; 55/501; 55/521; 55/DIG. 31; 55/DIG. 39
[58] Field of Search ................ 55/497, 499, 500, 501, 55/521, DIG. 31, 481, DIG. 39

[56] References Cited

U.S. PATENT DOCUMENTS

| | | | |
|---|---|---|---|
| 2,074,294 | 3/1937 | Woodruff | 55/500 X |
| 2,907,408 | 10/1959 | Engle et al. | 55/497 X |
| 3,047,994 | 8/1962 | Le Brun | 55/DIG. 31 X |
| 3,177,637 | 4/1965 | Davis | 55/499 X |
| 3,494,113 | 2/1970 | Kinney | |
| 3,789,589 | 2/1974 | Delany et al. | |
| 3,989,486 | 11/1976 | Baysinger | |
| 4,323,374 | 4/1982 | Shinagawa et al. | 55/521 X |

FOREIGN PATENT DOCUMENTS 1358867 3/1964 France ................................. 55/499

*Primary Examiner*—Kathleen J. Prunner
*Attorney, Agent, or Firm*—Paul A. Becker, Sr.

[57] ABSTRACT

A filter assembly in an air cleaner includes a lower wire-form adapted to receive two opposite ends of a pliable filter material. Spaced wires on the lower wire-form enable manual forming of pleats in the filter material and define the tops of such pleats. A complementary upper wire-form is engageable with the lower wire-form and attached filter to define the bottoms of such pleats.

5 Claims, 5 Drawing Figures

SUPPORT MEANS FOR FILTER MATERIAL IN A NON-ELECTRIC AIR CLEANER

BACKGROUND OF THE INVENTION

This invention relates to air cleaners employing replaceable filter material, and particularly to an improved filter material support means therein for facilitating replacement of the filter material.

There are generally three basic means available for filtering the circulated air in domestic heating and cooling systems. One means is a throw-away filter positioned within the blower chamber of the furnace. Such a filter, generally made of fiber-glass, is relatively inefficient in removing contaminants from the circulating air. Such a filter, however, is the most widely used filtering means because it is quite inexpensive, easily replaceable, and requires no major mounting structure.

Another of the three basic filtering means is a highly-efficient electrostatic air cleaner which includes a cell comprising an ionizing grid and collector plates, and an electrical power supply for generating the high voltages required for the cell. Such a device is relatively expensive to purchase. Also, because of the device's physical size, a frame of some type must be installed in the air duct for supporting the cell. Additionally, provisions must be made for connecting the cell power supply to a source of electrical power. Thus, in addition to the initial purchase cost of the electrostatic air cleaner itself, there can be an appreciable installation cost.

The third of the three basic filtering means is a non-electric filter which has a considerably larger filtering surface than the above-described fiber-glass filter. Such a filter has an efficiency considerably higher than that of the conventional fiber-glass filter and somewhat less than that of the electrostatic air cleaner. Examples of such non-electric filter means are disclosed in U.S. Pat. Nos. 3,494,113 and 3,789,589.

The larger filtering surface in the non-electric filter is achieved by pleating the filter material. Because such pleating results in a filter that is physically thicker or wider than the conventional fiber-glass filter, such a pleated filter does not fit in the blower chamber of the furnace. Such a pleated filter, therefore, is generally mounted in the air duct. Even though both the pleated filter and the electrostatic air cleaner require modification of the air duct, the overall installed cost to the homeowner is less with the pleated filter arrangement than with the electrostatic air cleaner. Specifically, the purchase cost of the complete pleated filter assembly is less, and there are no electrical connections involved.

In the pleated filter arrangement, it is necessary to replace the filter material when it becomes excessively dirty. It is considered essential that the periodic filter replacement be relatively simple so as to be within the capability of a do-it-yourself homeowner.

SUMMARY OF THE INVENTION

An object of this invention is to provide, in an air cleaner, a generally new and improved support means for filter material which facilitates replacement of the filter material.

A further object of this invention is to provide, in an air cleaner, a two-piece wire-form for forming pleats in filter material and for supporting the resulting pleated filter.

A further object is to provide an air cleaner including a rigid frame mountable in an air duct and a filter assembly insertable into the frame, the filter assembly comprising a pleated filter formed and supported by a two-piece wire-form.

A further object is to provide an air cleaner as in the preceding paragraph wherein the rigid frame is capable of receiving the cell of a commercially-available electrostatic air cleaner instead of the pleated filter assembly whereby the air cleaner may be up-graded, if desired, to the higher-efficiency electrostatic air cleaner without having to further modify the air duct.

The above-mentioned and other objects and features of the present invention will become apparent from the following description when read in conjunction with the accompanying drawings.

DESCRIPTION OF THE PREFERRED EMBODIMENT

Figure 1:
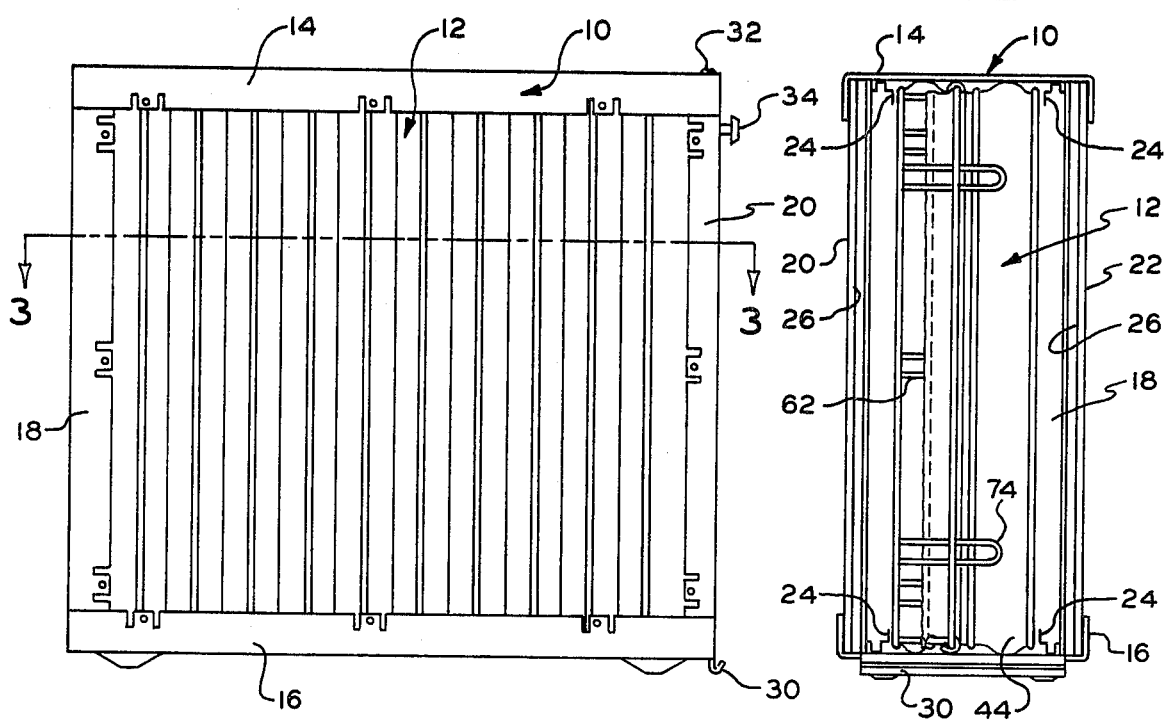
FIG. 1 is a side elevation view of an air cleaner constructed in accordance with the present invention.
Figure 2:
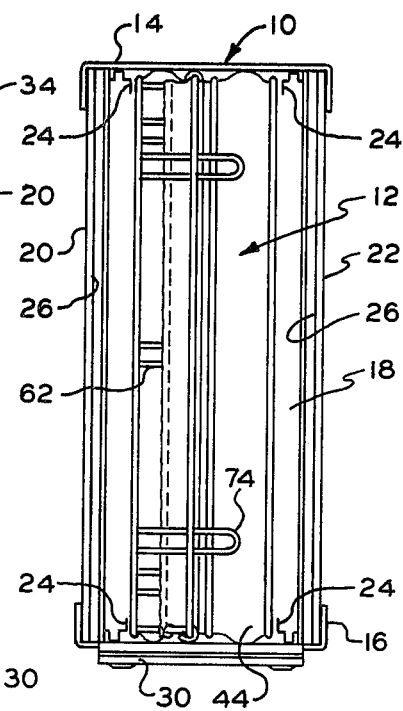
FIG. 2 is a front elevation view of the air cleaner of FIG. 1 with the access door removed.
Figure 3:
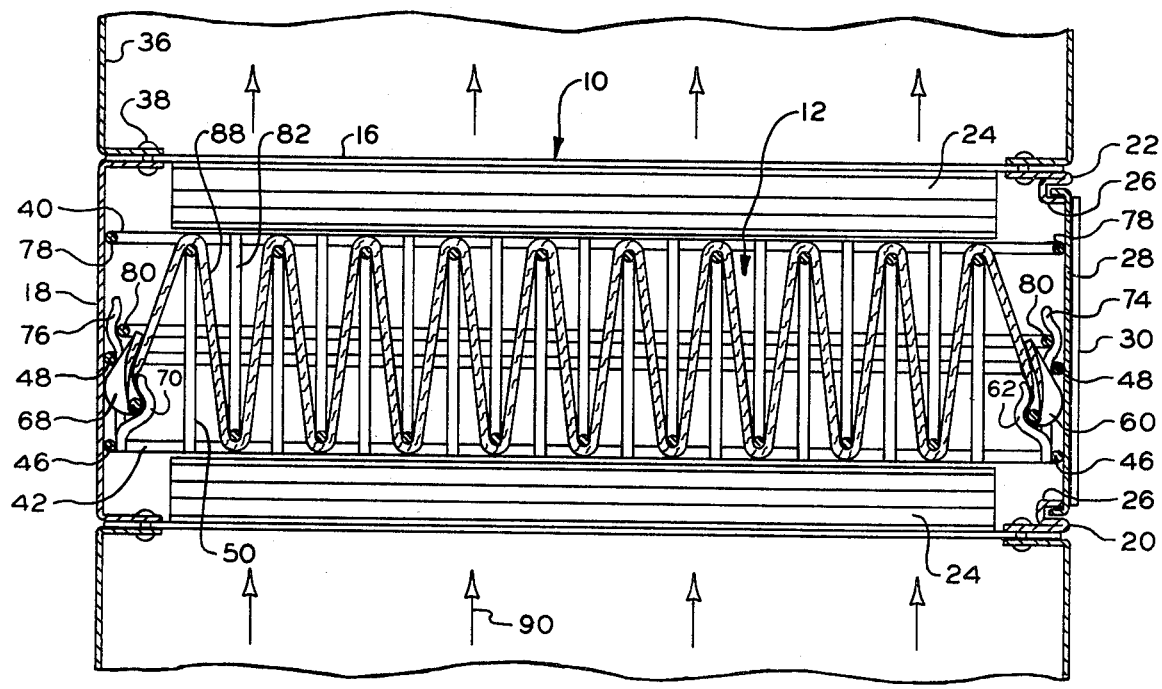
FIG. 3 is an enlarged cross-sectional view of the air cleaner of FIG. 1, taken along line 3—3 of FIG. 1, and shown mounted in an air duct.

Referring now to FIGS. 1, 2, and 3, an air cleaner comprises a support frame 10 and a filter assembly 12. The support frame 10 comprises an upper horizontal channel-shaped member 14, a lower horizontal channel-shaped member 16, a rear vertical channel-shaped member 18 attached to upper member 14 and lower member 16, and front vertical members 20 and 22 also attached to upper member 14 and lower member 16.

Upper and lower horizontal channel-shaped members 14 and 16 are each provided with a pair of spaced, parallel, guide rails 24 between which the filter assembly 12 is positioned. Front vertical members 20 and 22 each include a U-shaped portion 26 for accepting a channel-shaped access door 28. Door 28 is nested in a lip portion 30 on lower member 16 and attached by means of a screw 32 to upper member 14. A knob 34 on door 28 facilitates handling of door 28. Frame 10 is positioned transversely in an air duct 36 and is connected therein by rivets 38.

Figure 4:
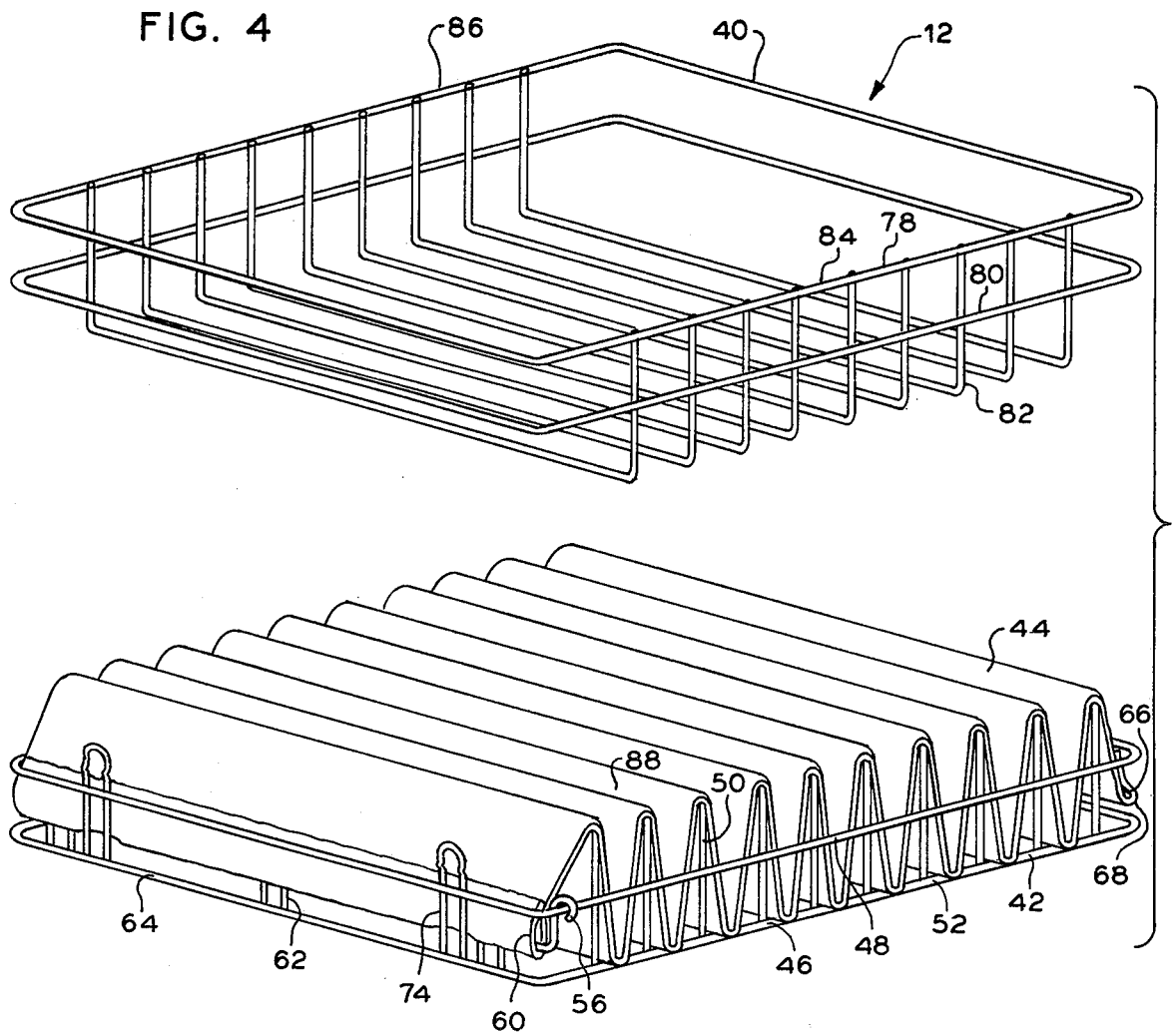
FIG. 4 is an exploded perspective view of the filter assembly of the present invention shown with the filter material attached to a lower portion of the two-piece wire-form support means and prior to attachment of an upper portion of the support means to the lower portion thereof.

Referring now to FIG. 4, filter assembly 12, prior to assembly, comprises an upper wire-form portion 40, a lower wire-form portion 42, and a sheet of filter material 44. As will be hereinafter described, the complete wire-form filter assembly 12 is effected by attaching the filter material 44 to lower portion 42, pleating the filter material 44, and then attaching upper portion 40 to lower portion 42.

Figure 5:
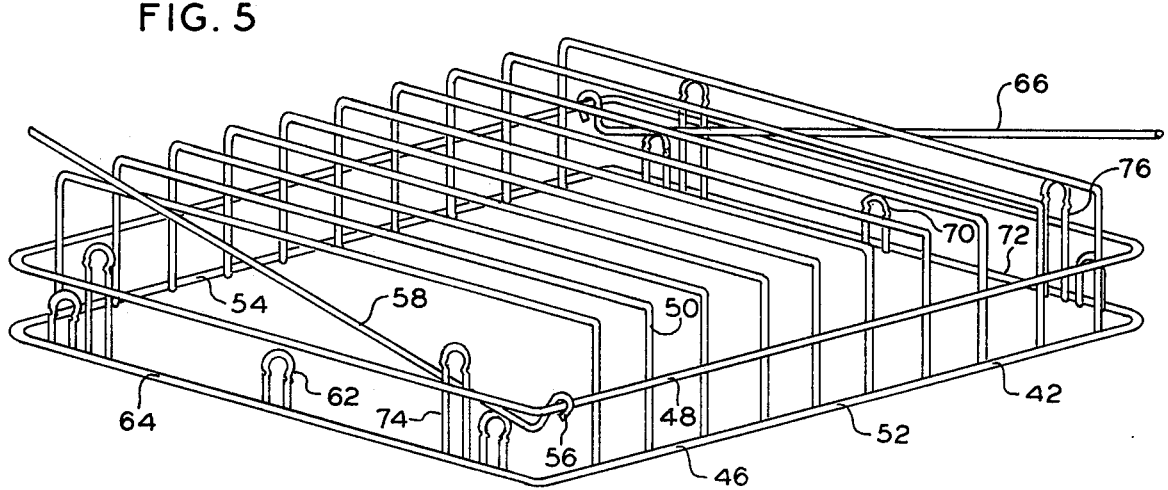
FIG. 5 is a perspective view of the lower portion of the two-piece wire-form support means shown prior to attachment of the filter material.

Referring now to FIG. 5, lower portion 42 of filter assembly 12 comprises a generally rectangular wire-form having a lower peripheral loop 46, a parallel-spaced upper peripheral loop 48, and ten spaced cross-over loops 50 having vertical portions attached to the lower and upper peripheral loops 46 and 48 of two opposite sides 52 and 54 of lower portion 42, and horizontal portions extending between the two opposite sides 52 and 54 in a plane parallel with and above that of upper peripheral loop 48.

A hook-shaped end 56 of a wire rod 58 is pivotally attached to upper peripheral loop 48 near one end thereof on one side 52 of lower portion 42. Rod 58 receives a looped end 60 of filter material 44, as shown in FIG. 4, and is subsequently firmly engaged in lower portion 42 by means of three flexible wire-form tabs 62 attached to and extending upwardly from lower peripheral loop 46 on a side 64 of lower portion 42. Similarly, another rod 66 is pivotally attached to upper peripheral loop 48 near one end thereof on side 54 of lower portion 42. Rod 66 receives a looped end 68 of filter material 44, as shown in FIG. 4, and is subsequently engaged in lower portion 42 by means of three flexible tabs 70 attached to lower peripheral loop 46 on a side 72 of lower portion 42. It is noted that alternatively, rod 66 can be pivotally attached to upper peripheral loop 48 on the same side 52 to which rod 58 is pivotally attached.

Attached to lower and upper peripheral loops 46 and 48 on one side 64 of lower portion 42 are two flexible wire-form tabs 74. Attached on side 72 are two like tabs 76. As will be hereinafter described, tabs 74 and 76 function to accept the upper wire-form portion 40.

The upper wire-form portion 40, shown in FIG. 4, comprises a rectangular wire-form having essentially the same length, width, and depth as lower wire-form portion 42. Upper portion 40 includes an upper peripheral loop 78, a parallel-spaced lower peripheral loop 80, and nine spaced cross-over loops 82. Loops 82 comprise vertical portions attached to the upper and lower peripheral loops 78 and 80 of two opposite sides 84 and 86 of upper portion 40, and horizontal portions extending between the two opposite sides 84 and 86 in a plane parallel with and below that of lower peripheral loop 80.

Filter material 44 is a soft, pliable, high-efficiency, fibrous material. There are a number of suitable materials available but, preferably, the desired material is a pre-charged, synthetic material made from non-woven electret fibers which removes contaminants by built-in electrostatic forces. Such a material is available from 3M Center of St. Paul, Minn. When utilizing the preferred material, the conventional "dust spot" method of testing showed filter assembly 12 to be approximately 60% efficient at an air flow of 1000 cubic feet per minute.

The filter material 44 is provided as a long sheet, folded in any convenient manner for simplicity of storage, having opposite ends stitched in a reverse fold to form the previously described looped ends 60 and 68.

To initially install filter material 44, or to replace it after it becomes excessively dirty, the first step is to insert rods 58 and 66 of lower wire-form portion 42 into looped ends 60 and 68, respectively, of filter material 44. Rods 58 and 66, with filter material 44 attached, are then pushed into engagement with flexible tabs 62 and 70, respectively.

The next step is to form a plurality of pleats 88 in filter material 44 by manually pushing filter material 44 downwardly, as viewed in FIG. 4, at the spaces between cross-over loops 50 of lower portion 42. The filter material 44 is pushed downwardly until the bottoms of the formed pleats 88 are approximately in the same plane as the plane of lower peripheral loop 46 of lower portion 42.

After the pleats 88 have been formed as described above, the upper portion 40 is moved toward engagement with lower portion 42. Specifically, upper portion 40 is moved downwardly, as viewed in FIG. 4, until the lower peripheral loop 80 of upper portion 40 is engaged by flexible tabs 74 and 76 of lower portion 42. As shown in FIG. 3, when so engaged, the cross-over loops 82 of upper portion 40 contact the bottoms of the formed pleats 88. In this condition, the tops of pleats 88 are defined by cross-over loops 50 of lower portion 42, and the bottoms of pleats 88 are defined by cross-over loops 82 of upper portion 40.

For a reason hereinafter described, filter material 44 is preferably dimensioned so that it extends outwardly slightly past the vertical portions of cross-over loops 50 and 82 of lower portion 42 and upper portion 40, respectively. Also, filter material 44 is sufficiently pliable so that its looped ends 60 and 68 extend outwardly slightly beyond the vertical plane defined by lower peripheral loop 46 and upper peripheral loop 48 of lower portion 42.

As shown in FIG. 3, the complete filter assembly 12 is positioned in frame 10 between guide rails 24 and in contact with rear member 18 of frame 10 and access door 28. Because of the previously-described outward extensions of looped ends 60 and 68 of filter material 44, any appreciable unfiltered air, air flow being indicated by arrows 90, is prevented from flowing between filter material 44 and rear member 18 and between filter material 44 and access door 28. As shown in FIG. 2, filter assembly 12 is also in contact with upper horizontal member 14 and lower horizontal member 16 of frame 10. Because of the previously-described outward extensions of filter material 44 past the vertical portions of cross-over loops 50 and 82, any appreciable unfiltered air is also prevented from flowing between filter material 44 and members 14 and 16. Thus, because of the above-described outward extensions of filter material 44, essentially all of the air flow circulating in air duct 36 passes through filter material 44 to be filtered thereby.

An advantage of the construction of frame 10 is that it can be utilized to convert the air cleaner of this invention to a conventional electrostatic air cleaner such as that shown in U.S. Pat. No. 3,989,486. Specifically, if it is desired to so convert, frame 10 will accept a conventional cell between guide rails 24. Guide rails 24 will accept mechanical air filters generally used in conjunction with an electrostatic air cleaner. Finally, access door 28 would be replaced by a door containing the electrical power supply for the cell, and a terminal block would be added to frame 10.

While a preferred embodiment of the present invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

We claim:
1. The combination of filter material and support means therefor, wherein said support means comprises:
a lower wire-form portion,
said lower portion being generally rectangular and having lower and upper peripheral loops and a plurality of spaced cross-over loops having vertical portions attached to said peripheral loops on two opposite sides of said lower portion;

said cross-over loops further having horizontal portions extending between said opposite sides in a plane parallel to and above that of said upper peripheral loop;

means attached to said lower portion for securing opposite ends of the filter material thereto;

said cross-over loops being effective to enable manual forming of said filter material into a plurality of pleats having tops and bottoms, said tops of said pleats being defined by said cross-over loops;

flexible tab means attached to the other two opposite sides of said lower portion;

an upper wire-form portion, said upper portion being generally rectangular and having lower and upper peripheral loops and a plurality of spaced cross-over loops having vertical portions attached to said peripheral loops on two opposite sides of said upper portion;

said cross-over loops on said upper portion further having horizontal portions extending between said opposite sides of said upper portion in a plane parallel to and below that of said lower peripheral loop of said upper portion;

said lower peripheral loop of said upper portion being engageable by said flexible tab means, and when so engaged, said cross-over loops on said upper portion being effective to define said bottoms of said pleats.

2. The combination claimed in claim 1 wherein said opposite ends of the filter material comprise looped ends, and said means attached to said lower portion for securing opposite ends of the filter material comprise, for each said looped end, a rod pivotally attached to said lower portion and insertable into said looped end and a plurality of flexible tabs attached to said lower portion for engaging each of said rods.

3. An air cleaner comprising:
a support frame;
a filter assembly insertable into said support frame,
said filter assembly comprising filter material and a wire-form means having a lower and upper portion for supporting said filter material;
said lower portion comprising means for attaching said filter material thereto, means for enabling the forming of said filter material into a plurality of pleats having tops and bottoms and for defining said tops of said pleats, and means for engaging said upper portion;
said upper portion comprising means for defining said bottoms of said pleats when said upper portion is engaged with said lower portion.

4. The air cleaner claimed in claim 3 wherein said filter material extends slightly outwardly past said wire-form means so as to prevent any appreciable unfiltered air from flowing between said filter assembly and said support frame when said filter assembly is inserted into said support frame.

5. The air cleaner claimed in claim 3 wherein said support frame includes guide rails between which said filter assembly is positioned.

* * * * *